United States Patent
Kumar et al.

(10) Patent No.: US 10,231,103 B2
(45) Date of Patent: Mar. 12, 2019

(54) AUTOMATED PROVISIONING OF APPLICATIONS

(71) Applicant: VMware, Inc., Palo Alto, CA (US)

(72) Inventors: Bhavesh Krishna Kumar, Atlanta, GA (US); Adarsh Jain, Atlanta, GA (US); Janani Vedapuri, Atlanta, GA (US); Akshay Galande, Atlanta, GA (US); Daniel Quintas, Atlanta, GA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/597,722

(22) Filed: May 17, 2017

(65) Prior Publication Data

US 2018/0213347 A1    Jul. 26, 2018

Related U.S. Application Data

(60) Provisional application No. 62/450,932, filed on Jan. 26, 2017.

(51) Int. Cl.
  *H04W 4/50* (2018.01)
  *G06F 8/61* (2018.01)
  *H04L 12/24* (2006.01)
  *H04L 29/08* (2006.01)
  *H04L 29/06* (2006.01)

(52) U.S. Cl.
  CPC ............... *H04W 4/50* (2018.02); *G06F 8/61* (2013.01); *H04L 41/0876* (2013.01); *H04L 67/34* (2013.01); *H04L 63/06* (2013.01); *H04L 63/08* (2013.01)

(58) Field of Classification Search
  None
  See application file for complete search history.

(56) References Cited

U.S. PATENT DOCUMENTS

| | | | |
|---|---|---|---|
| 8,099,332 B2 * | 1/2012 | Lemay | G06F 8/61 705/26.1 |
| 9,083,566 B1 * | 7/2015 | Pearson | H04L 29/00 |
| 2008/0133487 A1 * | 6/2008 | Gross | G06F 17/30864 |
| 2013/0132941 A1 * | 5/2013 | Lindeman | H04L 67/34 717/176 |

(Continued)

OTHER PUBLICATIONS

Amadeo, "A review of Android for Work: Dual-persona support comes to Android", 2015, https://arstechnica.com/information-technology/2015/03/a-review-of-android-for-work-dual-persona-support-comes-to-android/.*

(Continued)

*Primary Examiner* — Hossain M Morshed
(74) *Attorney, Agent, or Firm* — Thomas Horstemeyer, LLP (57) ABSTRACT

Disclosed are various embodiments for automating the provision of applications to managed client devices. A search string is passed through an iFrame embedded in a web page to a remote computing device that provides an application programming interface (API) for an application store. A search result is then received through the iFrame from the remote computing device and displayed in the iFrame. The iFrame then provides a notification of an approval for publication of an application identified by the search result and details of the application. The details of the application are then sent to the remote computing device to cause the application store to distribute the application to a client device.

20 Claims, 3 Drawing Sheets

(56) References Cited

U.S. PATENT DOCUMENTS

| | | | | |
|---|---|---|---|---|
| 2013/0219381 | A1* | 8/2013 | Lovitt | G06F 8/65 |
| | | | | 717/173 |
| 2013/0227683 | A1* | 8/2013 | Bettini | G06F 21/57 |
| | | | | 726/22 |
| 2014/0007222 | A1* | 1/2014 | Qureshi | G06F 21/10 |
| | | | | 726/16 |
| 2014/0316990 | A1* | 10/2014 | Winston | G06F 9/4411 |
| | | | | 705/44 |
| 2015/0046918 | A1 | 2/2015 | Rong et al. | |
| 2016/0057559 | A1* | 2/2016 | Deasy | H04W 76/10 |
| | | | | 455/411 |
| 2016/0080358 | A1* | 3/2016 | Ghanaie-Sichanie | |
| | | | | H04L 9/3234 |
| | | | | 726/5 |
| 2017/0302613 | A1* | 10/2017 | Imbrie | H04L 51/32 |
| 2018/0213347 | A1* | 7/2018 | Kumar | G06F 8/61 |

OTHER PUBLICATIONS

Anonymous, "System and apparatus of installing softwares on multiple virtual machines by virtual screen", 2011, IP.com, IP.com No. IPCOM000206940D (Year: 2011).*
International Search Report dated PCT/US2018/014923.

* cited by examiner

AUTOMATED PROVISIONING OF APPLICATIONS

CROSSREFERENCE TO RELATED APPLICATIONS

This application claims priority to, and the benefit of, U.S. Provisional Patent Application No. 62/450,932, entitled "AUTOMATED PROVISIONING OF APPLICATIONS" and filed on Jan. 26, 2017, which is incorporated by reference as if set forth herein in its entirety.

BACKGROUND

Mobile computing devices that use Google's ANDROID® operating system can implement a feature referred to as ANDROID FOR WORK®. This features allows for an enterprise to install enterprise related applications and data in a separate section of memory on the mobile computing device which is access restricted. This allows for personal and enterprise data and applications to be installed and executed on the same mobile computing device while allowing the enterprise to prevent personal applications from accessing enterprise data and vice versa.

In order for an administrator to authorize an application to be installed in the enterprise controlled portion of an ANDROID FOR WORK device, a number of steps must be taken. First, the administrator has to search for a particular application on the Google PLAY® store, select the application, and authorize it for deployment or publication to mobile computing devices managed by a corresponding mobile device management (MDM) system. Second, the administrator then has to manually enter the details of the approved application into the MDM system (e.g., enter the name of the application, application identifier, etc.) before the administrator can then select individual devices that are authorized to install the selected application. As a result, the approval and publication process for an individual app involves a multi-step workflow involving multiple different systems (e.g., the Google PLAY® store, a management console for the MDM system, etc.).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for streamlining and automating the provisioning of applications from an application store (e.g., the Apple ITUNES® store, the Google PLAY® store, or the WINDOWS STORE®) to one or more mobile computing devices controlled by an MDM system. These embodiments allow an administrator of an MDM system to use a single, integrated management console to search for applications in an application store and manage deployment of the applications using the MDM system. In the following discussion, a general description of the system and its components is provided, followed by a discussion of the operation of the same.

Figure 1:
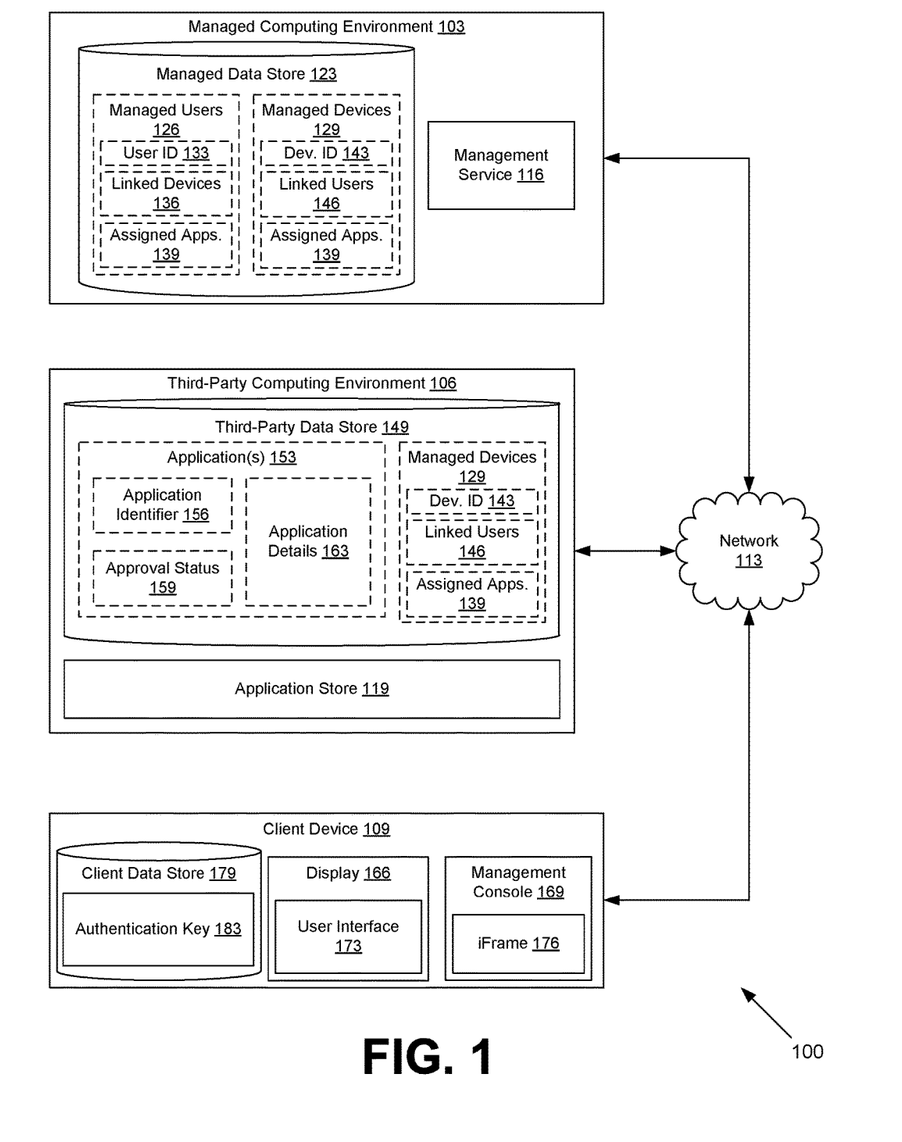
FIG. 1 is a schematic block diagram depicting an example of a network environment

Beginning with FIG. 1, shown is an example of a networked environment 100. The networked environment 100 includes a managed computing environment 103, a third-party computing environment 106, and a client device 109, which are in data communication with each other via a network 113. The network 113 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®, BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The managed computing environment 103 and the third-party computing environment 106 can each include, for example, a server computer or any other system providing computing capability. Alternatively, the managed computing environment 103 or the third-party computing environment 106 can employ a plurality of computing devices that can be arranged, for example, in one or more server banks or computer banks or other arrangements. Such computing devices can be located in a single installation or can be distributed among many different geographical locations. For example, the managed computing environment 103 or the third-party computing environment 106 can include a plurality of computing devices that together can include a hosted computing resource, a grid computing resource or any other distributed computing arrangement. In some cases, the managed computing environment 103 or the third-party computing environment 106 can correspond to an elastic computing resource where the allotted capacity of processing, network, storage, or other computing-related resources can vary over time. In some instances, the managed computing environment 103 and the third-party computing environment 106 can be hosted within the same computing environment or be separate logical components of the same computing environment. This could occur, for example, if the managed computing environment 103 and the third-party computing environment 106 corresponded to one or more virtualized computing devices hosted by the same provider or in the same datacenter.

Various applications or other functionality can be executed in the managed computing environment 103 according to various embodiments. The components executed on the managed computing environment 103, for example, can include a management service 116, and other applications, services, processes, systems, engines, or functionality not discussed in detail herein. The management service 116 can be executed to administer the operation of various client devices 109 registered or otherwise enrolled with the management service 116. To this end, the management service 116 can track which applications have been installed on individual client devices 109, which applications have been selected or approved for installation on individual client devices 109, and enforce requirements that particular applications be installed to (or uninstalled from) various client devices 109.

Likewise, various applications or other functionality can be executed in the third-party computing environment 106 according to various embodiments. The components executed on the third-party computing environment 106, for example, can include an application store 119, and other applications, services, processes, systems, engines, or functionality not discussed in detail herein. The application store 119 can be executed to make applications available to one or more client devices 109, install one or more applications onto specified client devices 109 at the request of the client device 109 or the management service 116, or allow for a user or administrator to search for an application to install or approve for installation. Examples of application stores 119 include the GOOGLE PLAY STORE, the APPLE ITUNES STORE, and the WINDOWS STORE.

Also, various data is stored in a managed data store 123 that is accessible to the computing environment 203. The managed data store 123 can be representative of a plurality of data stores, which can include relational databases, object-oriented databases, hierarchical databases, hash tables or similar key-value data stores, as well as other data storage applications or data structures. The data stored in the managed data store 123 is associated with the operation of the management service 116 and potentially other applications or functional entities described later. This data can include managed users 126, managed devices 129, and potentially other data.

The managed users 126 can represent user accounts that for users that are administratively managed by the management service 116. Each managed user 126 can include a user identifier 133, a list of linked devices 136, and a list of assigned applications 139. The user identifier 133 can include a username, an identification number, or other attribute that uniquely identifies a user from other users. The list of linked devices 136 can include one or more device identifiers 143 of client devices 109 managed by the management service 116 that are associated with the user (e.g., a smartphone, a tablet, and a laptop of a user). The list of assigned applications 139 can include a list of applications that the user has been authorized to use on one or more of his or her devices.

The managed devices 129 can represent client devices 109 that are managed by the management service 116. Each managed device 129 can include a device identifier 143, a list of linked users 146, and a list of assigned applications 139. The device identifiers 143 can include serial number, a hardware identification number, a media access control (MAC) address or International Mobile Equipment Identity (IMEI) number of a network card installed on the client device 109, or other attribute that uniquely identifies a client device 109 from other client devices 109 managed by the management service 116. The list of linked users 146 can include user identifiers 133 of one or more managed users 126 associated with a client device 109. For example, where multiple users are known to use a client device 109 (e.g., multiple users of a workstation or laptop), the user identifier 133 of each managed user 126 can be stored in the list of linked users 146. The list of assigned applications 139 can include can include a list of applications that have been authorized by the management service 116 to be installed on one the managed device 129.

Also, various data is stored in a third-party data store 149 that is accessible to the third-party computing environment 106. The third-party data store 149 can be representative of a plurality of data stores, which can include relational databases, object-oriented databases, hierarchical databases, hash tables or similar key-value data stores, as well as other data storage applications or data structures. The data stored in the third-party data store 149 is associated with the operation of the application store 119 and various others applications or functional entities described later. This data can include one or more applications 153, data regarding one or more managed devices 129 provided by the management service 116, and potentially other data.

The application 153 can represent a binary application that can be installed on the client device 109 through the application store 119. The application 153 can include an application identifier 156, an approval status 159, and one or more application details 163. The application identifier 156 represents a serial number, name, hash, or other identifier of the application 153 that uniquely identifies the application 153 with respect to other applications. The approval status 159 represents whether the application 153 has been approved by the management service 116 for installation on or by one or more managed devices 129. The application details 163 can include the name of the application 153, the version of the application 153, a description of the application 153, one or more search terms or keywords associated with the application 153, any dependencies for executing the application 153, an operating system or device type capable of executing the application, and potentially other data.

The client device 109 is representative of a plurality of client devices that can be coupled to the network 113. The client device 109 can include, for example, a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 109 can include one or more displays 166, such as liquid crystal displays (LCDs), gas plasma-based flat panel displays, organic light emitting diode (OLED) displays, electrophoretic ink ("E-ink") displays, projectors, or other types of display devices. In some instances, the display 166 can be a component of the client device 109 or can be connected to the client device 109 through a wired or wireless connection.

The client device 109 can be configured to execute various applications such as a management console 169 or other applications. The management console 169 can be executed as a browser-based web-application or, in some instances, a standalone application. Accordingly, the management console 169 can cause a user interface 173 on the display 166. To this end, the user interface 173 can include a web page, an application screen, of other user mechanism for obtaining user input. The management console 169 can also include an iFrame 176, which can provide functionality for the management console 169 to interact with the application store 119 and display the results of these interactions within the user interface 173. For example, the iFrame 176 can provide an interface within the user interface 173 of the management console 169 that allows an administrative user to search for individual applications 153, approve individual applications 153, unapproved previously approved applications 153, or perform other interactions with the application store 119.

The management console 169 can be executed in a client device 106, for example, to allow an administrative user to control the management service 116. For example, the management console 169 can allow an administrative user to select particular managed devices 129 controlled by the management service 116 for which an approved application 153 is to be installed. As another example, the management console 169 can allow the administrative user to search for and approve individual applications 153 for installation on one or more managed devices 129.

Also, various data is stored in a client data store 179 that is accessible to the client device 109. The client data store 179 can be representative of a plurality of data stores, which can include relational databases, object-oriented databases, hierarchical databases, hash tables or similar key-value data stores, as well as other data storage applications or data structures. The data stored in the client data store 179 is associated with the operation of the management console 169 and potentially other applications or functional entities described later. This data can include an authentication key 183, and potentially other data. The authentication key 183 can include a token, key, or other unique data item that the iFrame 176 can submit to the application store 119 to verify that the iFrame 176 is allowed to communicate and interact with the application store 119.

Next, a general description of the operation of the various components of the networked environment 100 is provided. To begin, an administrative user enters a search string into the iFrame 176 of the management console 169. The search string could correspond to a name of the application 153, a description of the application 153, a type of application 153, or other query parameter. The iFrame 176 then passes the search string to the application store 119 (e.g., the Google PLAY® store).

Next, the application store 119 authenticates the user of the management console 169 to determine whether he or she is allowed to view or search for applications 153 in the application store 119. Upon successful authentication, the application store 119 provides search results that correspond to the search string received from the iFrame 176. The search results could include a list of applications 153 that match the search string, excluding applications 153 that the user of the management console is prohibited from accessing (e.g., outdated versions of applications, custom applications for specific users or enterprises, etc.). The search results are returned to the iFrame 176, which renders the search results within the user interface 173 of the management console 169.

The iFrame 176 can include a listener, trigger, or keylogging component that can be configured to identify and track the administrative user's interactions with the search results. The listener, trigger, or keylogging component can, for example, be used by the iFrame 176 to determine whether the administrator has selected an application 153 from the search results and changed the approval status 159 of the application 153 (e.g., marking a previously unapproved application 153 as approved or revoking a prior approval of the application 153). Once the iFrame 176 determines that the administrator has selected an application 153 from the search results and approved the application 153 for distribution to one or more managed devices 129, the iFrame 176 can communicate the application details 163 of the selected application 153 to the management console 169.

The management console 169 can use the application details 163 received from the iFrame 176 to render and populate certain fields in an application assignment screen within the user interface 173 of the management console 169. The application assignment screen can include a number of fields through which an administrator can specify one or more characteristics for assignment of an application for provisioning on various client devices 109 managed by the management console 169. In particular, the application assignment screen can include a field within which a particular application 153 can be designated for provisioning. In one embodiment, the management console 169 can populate such application designation field using the application details 163 provided by the iFrame. For instance, if the management console 169 identified an administrator selection of ANGRY BIRDS® for ANDROID® operating system of the version MARSHMALLOW® for tablet computing devices, the management console 169 can populate one or more application designation fields using such information; that is, an application name field can be populated with ANGRY BIRDS, an operating system type can be populated with ANDROID, an operating system version can be populated with MARSHMALLOW, and a computing device type can be populated with "tablet." In this way, the administrator is relieved of the burden of providing the management console 169 with application details 163 that have already been specified by the administrator when the administrator approved the application 153 for provisioning to managed devices 129 through the application store (by way of the iFrame 176).

Additionally, the application assignment screen can include a number of fields through which an administrator can specify one or more configuration settings for configuring the functionality of the application once provisioned to and executed by various managed devices 129. In one embodiment, the application assignment screen can present fields specific to the application details 163. For instance, if the application details 163 specify ANGRY BIRDS for ANDROID operating system of the version MARSHMELLOW for tablet computing devices, the application assignment screen can be configured to present fields for configuring features of the ANGRY BIRDS application 153 that are available on the application version specific to ANDROID MARSHMELLOW for tablet computing devices. To simplify the user experience of the administrator, the application assignment screen can further be configured to hide or not present fields for features of the ANGRY BIRDS application that are unavailable on the application version specific to ANDROID MARSHMELLOW for tablet computing devices—such as features that are exclusive to the application version specific to APPLE iOS or WINDOWS operating systems.

Additionally, the application assignment screen can include a device selection component through which one or more managed devices 129, or one or more groups of managed devices 129, can have the application 153 added to the list of assigned applications 139 for the managed devices 129. Using such device selection component of the application assigning screen, an administrator can select one or more managed devices 129 or groups of managed devices 129 to grant permission to install the application 153. The management component 169 can send a command to the management service 116 to store such selections in list of assigned applications 139 for each of the managed devices 129.

Further, the management service 116 can be configured to cause the managed devices 129 or groups of managed devices 129 selected through the device selection component of the management console 169 to download the specified application 153 and configure the selected application 153 using the specified configuration settings. In one embodiment, the management service 116 can place a command in a command queue associated with each of the managed devices 129 that, when retrieved and executed by the managed devices 129, causes the managed devices 129 to download the specified application 153 from the application store 119 and the specified configuration settings and further cause the managed devices 129 to configure the specified application 153 in accordance with the configuration settings. For instance, the command can cause the managed devices 129 to install a configuration profile in a profile bank of the operating system of the managed devices 129, the configuration profile including the configuration settings for the specified application 153 which the operating system enforces upon the specified application 153 when the operating system executes the selected application 153. In such an embodiment, the management service 116 can be further configured to transmit an instruction to an original equipment manufacturer (OEM) messaging service specific to the managed devices 129 (e.g., ANDROID CLOUD MESSAGING SERVICE™ for ANDROID client devices) to cause the OEM messaging service to send an instruction to the operating systems of the managed devices 129, which causes the managed devices 129 to retrieve commands from the command queues provided by the management service 116.

In another embodiment, the management console can transmit device identifiers 143 of the managed devices 129 (e.g., phone numbers, IMEI numbers, etc.) to the application store 119 along with an application identifier 156 for the selected application 153. When the application store 119 receives the list of device identifiers 143 and the application identifier 156, the application store 119 can cause the managed devices 129 to download the application 153. In some instances, the application store 119 can automatically cause the application 153 associated with the application identifier 156 to be deployed to the identified managed devices 129. In other instances, the application store 119 can merely make the identified application 153 available to the managed devices 129 should a user of a managed device 129 search for and request to download the identified application 153 from the application store 119. Notwithstanding the source and method from which a client device 109 downloads the specified application 153, the management service 116 can cause the client device 109 to execute the specified application 153 in accordance with the specified configuration settings.

Figure 2:
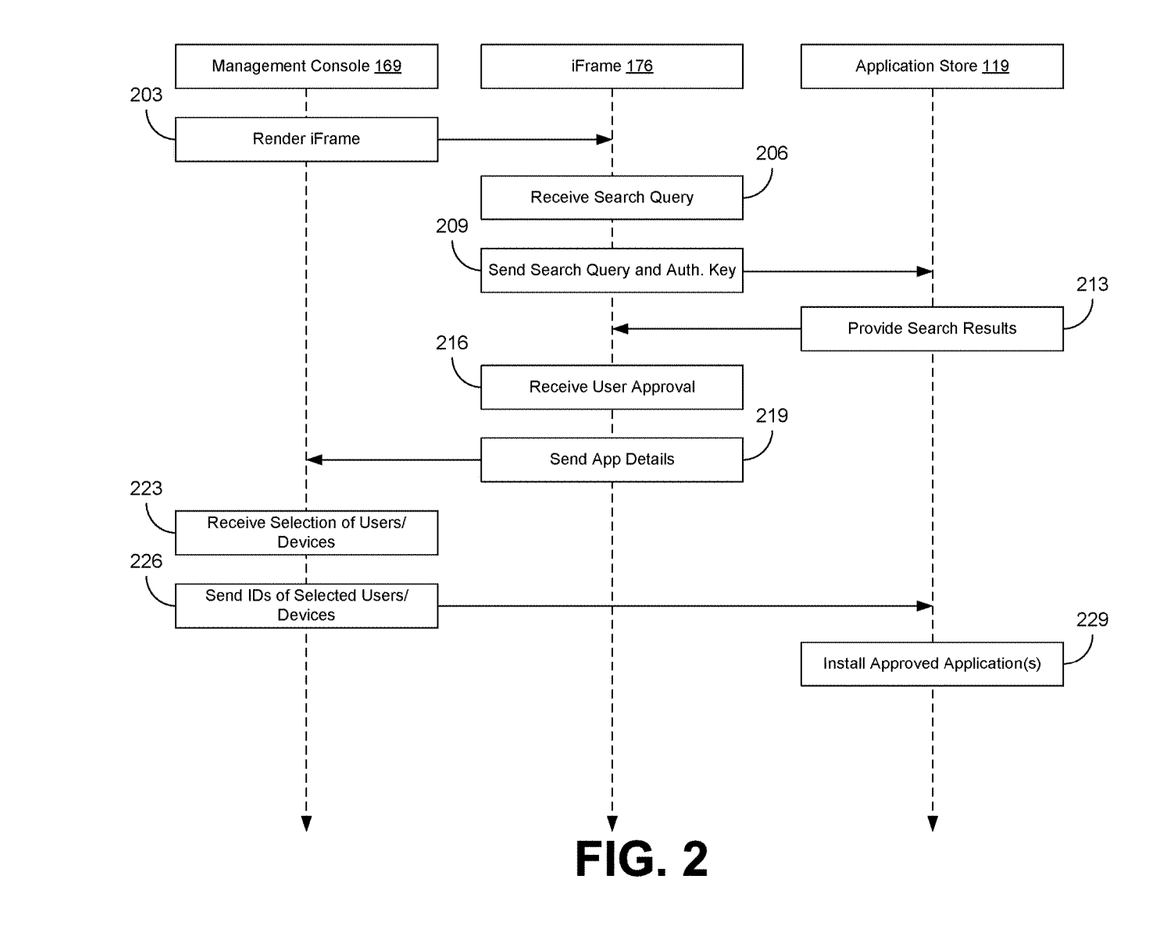
FIG. 2 is a sequence diagram depicting one example of a portion of the functionality of the present disclosure.

Moving on to FIG. 2, shown is a sequence diagram that provides an example of the interaction of various components of the present disclosure depicted in the network diagram of FIG. 1. It is understood that the sequence diagram of FIG. 1 provides merely an example of the many different possible interactions of the components described in this application.

Beginning with step 203, the management console 169 renders an iFrame 176 within a user interface 173. The user interface 173, for example, can correspond to a web page, an application screen, or user interface 173. The iFrame 176 can include executable code, such as JAVASCRIPT, that allows the iFrame 176 to communicate with the application store 119 and to pass any information related to interactions with the application store 119 to the management console 169.

Moving on to step 206, the iFrame 176 can receive a search query. The search query can include a search string containing one or more keywords, a list of parameters to match, or other search criteria. The search query can be submitted to the iFrame 176 through a search box, a list of check boxes corresponding to search parameters, or another search interface provided by the iFrame 176.

Proceeding to step 209, the iFrame 176 can send the search query received at step 206 and an authentication key 183 to the application store 119. The search query and authentication key 183 can be sent over an encrypted channel (e.g., a network connection protected by a version of the secure sockets layer (SSL) or transport layer security (TLS) protocol). The encrypted channel can be used in order to prevent the authentication key from being discovered by unauthorized parties, which could attempt to reuse the authentication key 183 in order to communicate with the application store 119 in an unauthorized manner.

Referring next to step 213, the application store 119 authenticates the iFrame 176, executes the search query, and provides one or more search results in response. For example, the application store 119 can authenticate the iFrame 176 by comparing the authentication key 183 provided by the iFrame 176 with a list of authorized authentication keys 183 maintained in the third-party data store 149. If the authentication key 183 provided by the iFrame 176 is included in the list of authorized authentication keys 183, then the application store 119 could determine that the iFrame 176 is authorized to communicate with or interact with the application store 119.

Assuming that the iFrame 176 is authorized to communicate with and interact with the application store 119, the application store 119 executes the search query provided by the iFrame 176. For example, the application store 119 can compare keywords in the search query to the name or description of the application 153 in the application details 163 of each application 153 stored in the third-party data store 149. As another example, the application store 119 can compare various parameters specified in the search query (e.g., specific version of the application 153) to information stored in that application details 163 of each application 153 stored in the third-party data store 149.

A list of applications 153 that match the search query can then be returned to the iFrame 176. For each application 153 included in the list of search results, one or more of the application details 163 can be included as well as the application identifier 156 and the current approval status 159 of the application 153.

Moving on to step 216, the iFrame 176 displays the search results and captures an approval of one or more applications 153 included in the search results. The approval can be captured by, for example, a callback function registered with the management console 169. The callback function can be triggered when a user selects an application 153 for approval. For example, if a user mouse clicked on a button labeled "Approve" in order to approve an application 153 for distribution to one or more managed devices 129, a callback function triggered by the mouse click could inform the iFrame 176 that an application 153 with the application identifier 156 had been approved.

Proceeding to step 219, the iFrame 176 sends one or more of the application details 163 for the approved application 153 or applications 154 to the management console 169. These application details 153 could include the name of the application(s) 153, the version of the application(s) 153, and potentially other information. The iFrame 176 can also send the application identifier 156 for each approved application 153 to the management console 169. The application details 163 and application identifier 156 can be passed or sent to the management console 169 using a callback function or other interprocess communication mechanism.

Referring to step 223, the management console 169 presents a listing of managed users 126, managed devices 129, groups of managed users 126, or groups of managed devices 129 in the user interface 173 and receives a selection of individual managed users 126, managed devices 129, groups of managed users 126, or groups of managed devices 129 for which the approved application(s) 153 are to be provided. For example, the management console 169 can query and received from the management service 116 the managed users 126, managed devices 129, groups of managed users 126, or groups of managed devices 129. The management console 169 can then present one or more of the managed users 126, managed devices 129, groups of managed users 126, or groups of managed devices 129 in an assignment screen. The management console 169 can then determine which of the managed users 126, managed devices 129, groups of managed users 126, or groups of managed devices 129 are selected by the user for provisioning of the approved applications 153.

Moving on to step 226, the management console 169 sends the user identifiers 133 or device identifiers 143 for selected ones of the managed users 126 and managed devices 129 to the application store 119. In some embodiments, the management console can also concurrently report the user identifiers 133 or device identifiers 143 for selected ones of the managed users 126 and managed devices 129, as well as the application identifier 156 of the approved application(s) 153, to the management service 116 so that the management service 116 can update the list of assigned applications 139 for each selected managed user 126 or managed device 129.

Proceeding to step 229, the application store 119 causes the approved application(s) 153 to be installed on each client device 109 included among the managed devices 129 provided to the application store 119 or associated with a managed user 126 identified to the application store 119. The application store 119 can cause the application(s) 153 to be installed in a number of ways. For example, the application store 119 can send, push, or otherwise automatically install the approved application(s) 153 using a mechanism included in the operating system of the client device 109 (e.g., an auto-install feature included in a client of the GOOGLE PLAY STORE or APPLE ITUNES STORE). As another example, the application store 119 can wait until the client device 109 connects to the application store 119 and prompt the client device 109 to install the approved application(s) 153 at that time. Once the approved application(s) 153 are installed, the application store 119 can add the application identifier 156 for each of installed application 153 to the list of assigned applications 139 for the managed device 129. After the approved application(s) 153 are installed, this example process then ends.

Figure 3:
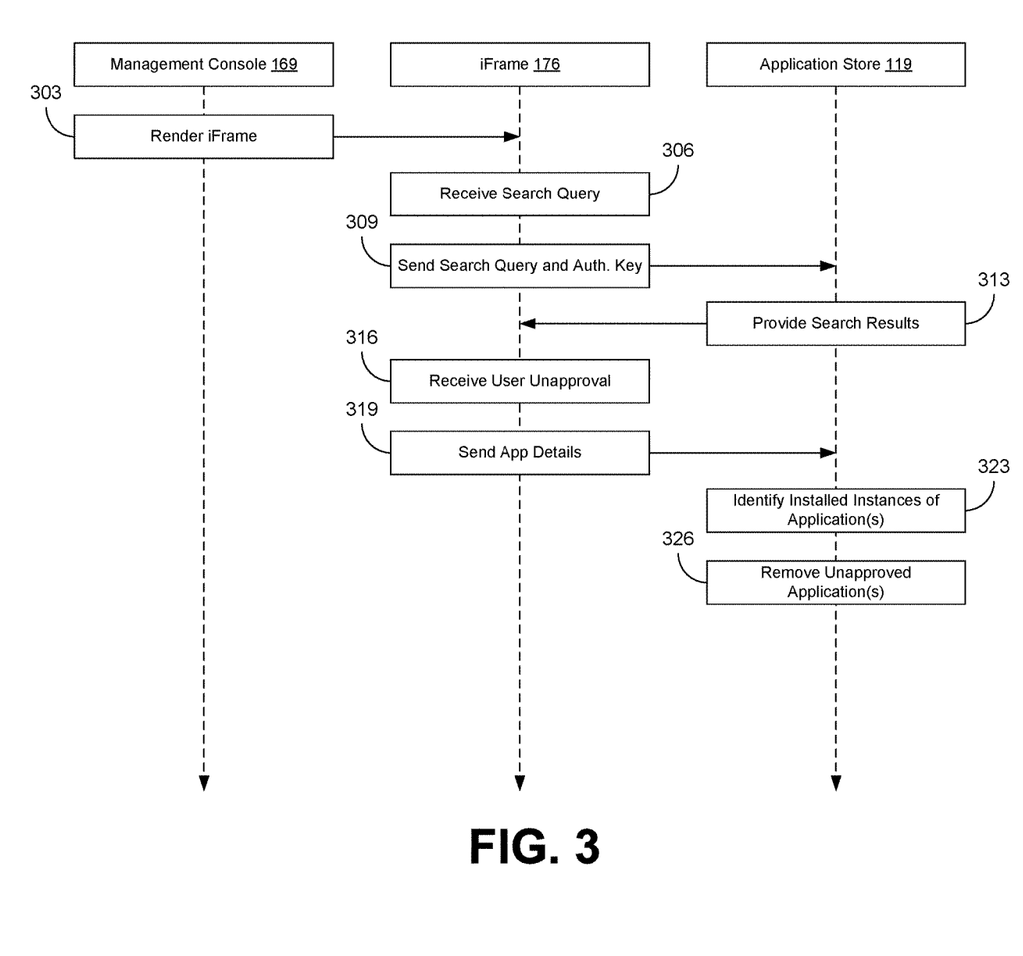
FIG. 3 is a sequence diagram depicting one example of a portion of the functionality of the present disclosure.

Proceeding to FIG. 3, shown is a sequence diagram that provides an example of the interaction of various components of the present disclosure depicted in the network diagram of FIG. 1. It is understood that the sequence diagram of FIG. 3 provides merely an example of the many different possible interactions of the components described in this application.

Beginning with step 303, the management console 169 renders an iFrame 176 within a user interface 173. The user interface 173, for example, can correspond to a web page, an application screen, or user interface 173. The iFrame 176 can include executable code, such as JAVASCRIPT, that allows the iFrame 176 to communicate with the application store 119 and to pass any information related to interactions with the application store 119 to the management console 169.

Moving on to step 306, the iFrame 176 can receive a search query. The search query can include a search string containing one or more keywords, a list of parameters to match, or other search criteria. The search query can be submitted to the iFrame 176 through a search box, a list of check boxes corresponding to search parameters, or another search interface provided by the iFrame 176.

Proceeding to step 309, the iFrame 176 can send the search query received at step 206 and an authentication key 183 to the application store 119. The search query and authentication key 183 can be sent over an encrypted channel (e.g., a network connection protected by a version of the secure sockets layer (SSL) or transport layer security (TLS) protocol). The encrypted channel can be used in order to prevent the authentication key from being discovered by unauthorized parties, which could attempt to reuse the authentication key in order to communicate with the application store 119 in an unauthorized manner.

Referring next to step 313, the application store 119 authenticates the iFrame 176, executes the search query, and provides one or more search results in response. For example, the application store 119 can authenticate the iFrame 176 by comparing the authentication key 183 provided by the iFrame 176 with a list of authorized authentication keys 183 maintained in the third-party data store 149. If the authentication key 183 provided by the iFrame 176 is included in the list of authorized authentication keys 183, then the application store 119 could determine that the iFrame 176 is authorized to communicate with or interact with the application store 119.

Assuming that the iFrame 176 is authorized to communicate with and interact with the application store 119, the application store 119 executes the search query provided by the iFrame 176. For example, the application store 119 can compare keywords in the search query to the name or description of the application 153 in the application details 163 of each application 153 stored in the third-party data store 149. As another example, the application store 119 can compare various parameters specified in the search query (e.g., specific version of the application 153) to information stored in that application details 163 of each application 153 stored in the third-party data store 149.

A list of applications 153 that match the search query can then be returned to the iFrame 176. For each application 153 included in the list of search results, one or more of the application details 163 can be included as well as the application identifier 156 and the current approval status 159 of the application 153.

Moving on to step 316, the iFrame 176 displays the search results and captures an unapproval (e.g., changing the approval status 159 from "approved" to "unapproved") of one or more applications 153 included in the search results. The unapproval can be captured by, for example, a callback function that is triggered when a user selects an application 153 to unapprove. For example, if a user mouse clicked on a button labeled "Unapprove" in order to unapprove an application 153 distributed to or installed on one or more managed devices 129, a callback function triggered by the mouse click could inform the iFrame 176 that an application 153 with the application identifier 156 had been was no longer approved.

Proceeding to step 319, the iFrame 176 sends one or more of the application details 163 for the unapproved application(s) the application store 119. These application details 153 could include the version of the unapproved application(s) 153, the application identifier 156 for each unapproved application(s) 153, and potentially other information.

Referring next to step 323, the application store 119 identifies all instances of the unapproved application(s) 153 installed on managed devices 129. For example, the application store 119 can first identify each managed device 129, and then determine whether an application identifier(s) 156 matching the unapproved application(s) 153 is included in a list of assigned applications 139 for the managed device 129.

Moving on to step 323, the application store 119 causes the unapproved application(s) 153 to be removed from each managed device 129 on which the unapproved application(s) 153 are installed. For example, the application store 119 can send an instruction that includes the application identifier(s) 156 of the unapproved application(s) 153 to each managed device 129 using a mechanism included in the operating system of the client device 109 (e.g., an auto-install feature included in a client of the GOOGLE PLAY STORE or APPLE ITUNES STORE). When the managed device 129 receives the instruction, it will automatically delete the application(s) 153. Once the approved application(s) 153 are installed, the application store 119 can remove the application identifier 156 for the unapproved application 153 from the list of assigned applications 139 for the managed device 129.

The sequence diagrams of FIG. 2 and FIG. 3 show an example of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams of FIG. 2 and FIG. 3 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for streamlining and automating provisioning of applications from a third-party application store to one or more managed client computing devices, comprising:
   a computing device comprising a processor and a memory; and
   machine readable instructions stored in the memory that, when executed by the processor, cause the computing device to at least generate a web page comprising a management console and an iFrame, wherein the management console is configured to at least:
      receive a notification from the iFrame of an approval for deployment of an application identified by a search result;
      in response to the approval, receive details of the application from the iFrame; and
      send an instruction to the third-party application store to distribute the application to the one or more managed client computing devices, the instruction including the details of the application received from the iFrame; and
   the iFrame is configured to at least:
      pass an authentication key to the third-party application store to verify that the iFrame is authorized to communicate with the third-party application store;

pass a search string to the third-party application store as an input to a function defined by an application programming interface (API) for the third-party application store;

in response to a successful authentication, receive the search result from the function of the API provided by the third-party application store;

render the search result;

capture an indication of an approval of the application identified by the search result for deployment; and provide the details of the application to the management console for deployment.

2. The system of claim 1, wherein the management console is further configured to at least display an assignment screen that comprises a list of managed client devices to which the application can be distributed.

3. The system of claim 1, wherein the management console is further configured to at least display an assignment screen that comprises a list of managed users to whom the application can be distributed.

4. The system of claim 1, wherein the authentication key is an authentication token.

5. The system of claim 1, wherein the notification and the details of the application are received from the iFrame through a callback function registered with the management console.

6. The system of claim 1, wherein the iFrame further comprises a text box in which the search string is entered.

7. The system of claim 1, wherein the details of the application comprise at least one of a unique identifier of the application, a version of the application, or a name of the application.

8. A method for streamlining and automating provisioning of applications from a third-party application store to one or more managed client computing devices, comprising:

passing a search string through an iFrame embedded in a web page to the third-party application store as an input to a function defined by an application programming interface (API) for the third-party application store;

passing an authentication key to the third-party application store to verify that the iFrame is authorized to communicate with the third-party application store;

in response to a successful authentication, receiving a search result through the iFrame from the third-party application store;

displaying the search result in the iFrame;

receiving, at a management console, a notification from the iFrame of an approval for publication of an application identified by the search result;

in response to receiving the approval by the iFrame, receiving details of the application at the management console from the iFrame; and sending an instruction comprising the details of the application to the third-party application store to distribute the application to the one or more managed client devices.

9. The method of claim 8, further comprising displaying an assignment screen that comprises a list of managed client devices to which the application can be distributed and the list of managed client devices includes at least one of the one or more managed client devices.

10. The method of claim 8, further comprising receiving the search string within the iFrame.

11. The method of claim 8, wherein the authentication key is an authentication token.

12. The method of claim 8, wherein the notification and the details of the application are received from the iFrame through a callback function.

13. The method of claim 8, wherein the web page comprises a management console.

14. The method of claim 8, wherein the details of the application further comprise at least one of a unique identifier of the application, a version of the application, or a name of the application.

15. A non-transitory computer readable medium storing machine readable instructions for streamlining and automating provisioning of applications from a third-party application store to one or more managed client computing devices that, when executed by a processor of a computing device, cause the computing device to at least:

pass a search string through an iFrame that is a component of a web page to the third-party application store as an input to a function that is defined by an application programming interface (API) for the third-party application store;

pass an authentication key to the third-party application store to verify that the iFrame is authorized to communicate with the third-party application store;

in response to a successful authentication, receive a search result through the iFrame from the third-party application store;

display the search result in the iFrame;

receive at a management console, a notification from the iFrame of an approval for publication of an application identified by the search result;

in response to receipt of the notification of the approval by the iFrame, receive details of the application at the management console from the iFrame; and send an instruction comprising the details of the application to the third-party application store to deploy the application to at least one of the one or more managed client computing devices.

16. The non-transitory computer readable medium of claim 15, wherein the machine readable instructions, when executed by the processor of the computing device, further cause the computing device to at least display an assignment screen that comprises a list of managed client devices to which the application can be distributed and the list of managed client devices includes at least one of the one or more managed client computing devices.

17. The non-transitory computer readable medium of claim 15, wherein the machine readable instructions, when executed by the processor of the computing device, further cause the computing device to at least receive the search string within the iFrame.

18. The non-transitory computer readable medium of claim 15, wherein the authentication key is an authentication token.

19. The non-transitory computer readable medium of claim 15, wherein the web page comprises a management console.

20. The non-transitory computer readable medium of claim 15, wherein the details of the application comprise at least one of a unique identifier of the application, a version of the application, or a name of the application.

* * * * *